Dec. 19, 1944.　　U. C. HAREN ET AL　　2,365,341
TIRE BUILDING APPARATUS
Filed Jan. 10, 1942　　3 Sheets-Sheet 1
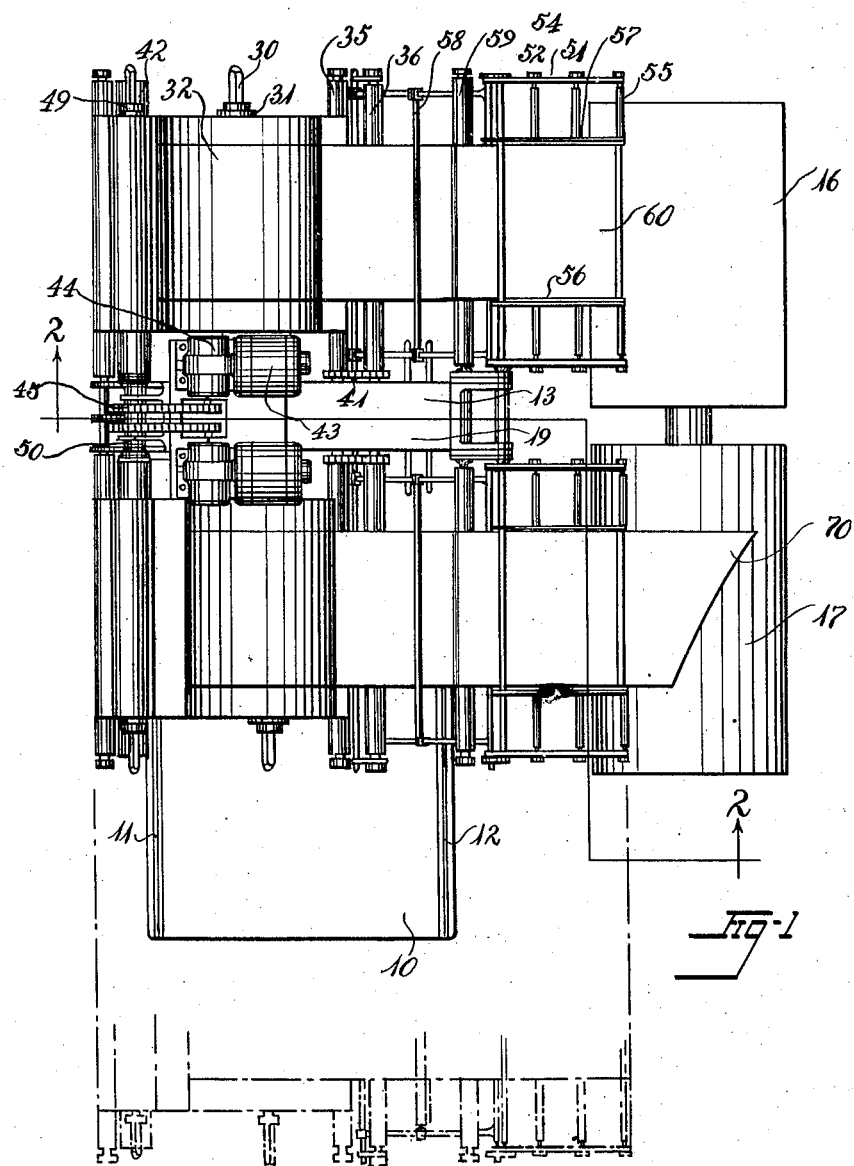

Dec. 19, 1944. U. C. HAREN ET AL 2,365,341
TIRE BUILDING APPARATUS
Filed Jan. 10, 1942 3 Sheets-Sheet 2
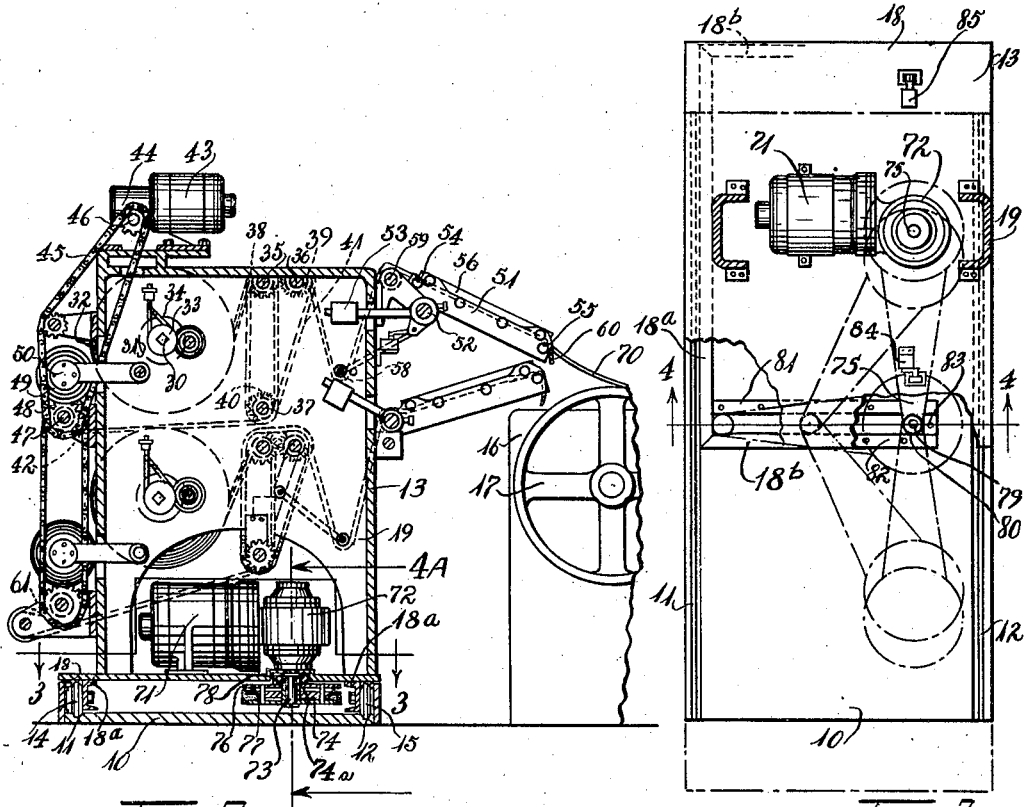
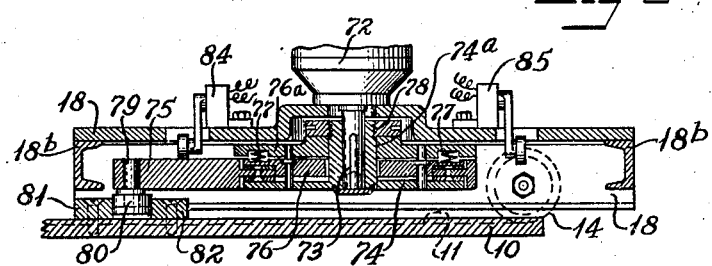
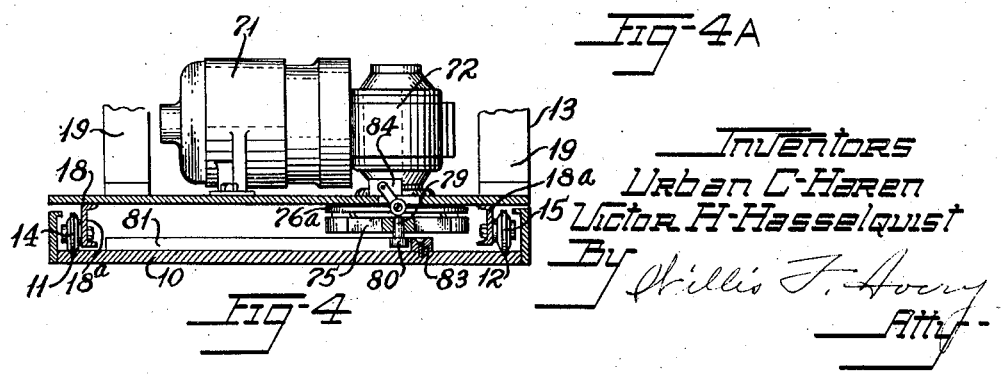

Dec. 19, 1944.  U. C. HAREN ET AL  2,365,341
TIRE BUILDING APPARATUS
Filed Jan. 10, 1942   3 Sheets-Sheet 3
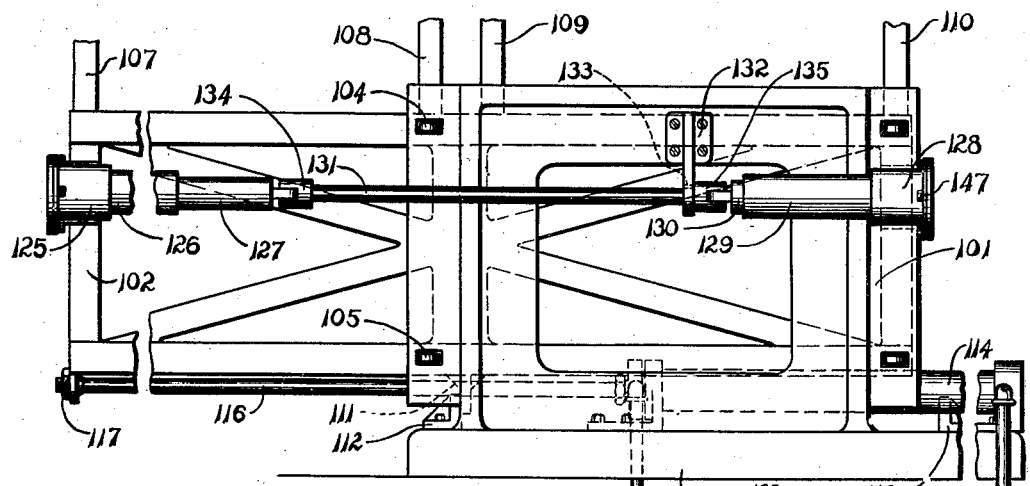
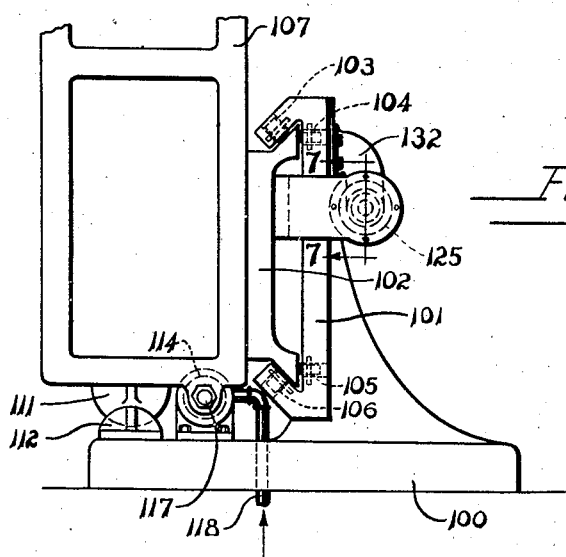
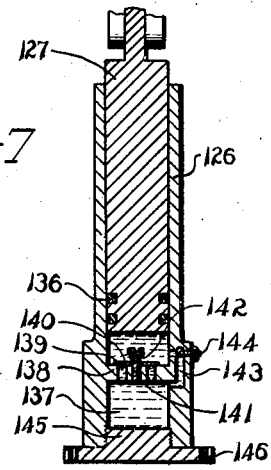

Patented Dec. 19, 1944

2,365,341

UNITED STATES PATENT OFFICE 2,365,341

TIRE BUILDING APPARATUS

Urban C. Haren and Victor H. Hasselquist, Akron, Ohio, assignors to The B. F. Goodrich Company, New York, N. Y., a corporation of New York Application January 10, 1942, Serial No. 426,330

3 Claims. (Cl. 154—10)

This invention relates to tire-building apparatus and especially to apparatus for supplying material to tire-building forms.

In the manufacture of pneumatic tires, strips of materials such as rubberized cord fabric and unvulcanized rubber composition of different dimensions are assembled about a drum, core, or former in superimposed relation. In drawing these materials in succession from rolls thereof to assemble them about a rotatable drum, each material requires a supply roll in which the material is wound between convolutions of a cloth liner and means for removing and rewinding the liner as the material is drawn from the roll, and equipment for storing and delivering a multiplicity of different materials ordinarily heretofore has demanded considerable space adjacent the building drum.

Heretofore, it has been difficult to align the stock rolls properly with the drum in a minimum amount of time, especially as the inertia of the stock rolls has interfered with the accurate alignment and has prevented speedy and quiet shifting of the stock rolls.

The present invention aims to overcome these and other difficulties and to provide improved apparatus.

The principal objects of the invention are to provide apparatus giving accuracy of alignment, increased speed of operation, and quiet shifting, to provide convenience of manipulation, and to avoid waste of material.

These and other objects will appear from the following description and the accompanying drawings.

Of the drawings,

Fig. 1 is a plan view of apparatus illustrating and embodying the invention in its preferred form, the full lines showing one position of the stock delivery apparatus and the dot-and-dash lines indicating a second position thereof.

Fig. 2 is a sectional elevation thereof, taken on line 2—2 of Fig. 1, parts being broken away.

Fig. 3 is a sectional plan view thereof, taken on line 3—3 of Fig. 2, parts being broken away.

Fig. 4 is a sectional view taken on line 4—4 of Fig. 3.

Fig. 4A is a sectional view taken on line 4A—4A of Fig. 2, parts being broken away.

Fig. 5 is a side elevation of a stock delivery apparatus showing a modified embodiment of the invention, only the lower portion of the apparatus being shown, other parts being broken away.

Fig. 6 is an elevation thereof looking from the right of Fig. 7.

Fig. 7 is a longitudinal cross-section of one of the shock absorbers taken on line 7—7 of Fig. 5.

In accordance with the invention, a carriage having a plurality of means for storing and delivering sheet material is mounted for movement along a support into a plurality of delivery positions in each of which positions one of the delivery means is accurately aligned with a rotatable building drum, and means are provided for moving the carriage quickly, for decelerating its movement at the ends of its movement, and for stopping it without overrun or underrun at the end of the movement.

Referring to the drawings, and first to the embodiment of the invention shown in Figs. 1 to 4, inclusive, the numeral 10 designates a bed plate having ways 11, 12. A sheet material delivery mechanism 13 has wheels 14, 15 mounted on frame members 18a, 18a for engaging the ways for movement therealong. Frame members 18a, 18a are connected by frame members 18b, 18b. A driving unit 16 for supporting and rotating a building drum 17 on a horizontal axis is located near the bed plate. The sheet delivery mechanism comprises a carriage 18 having a vertically disposed frame 19. On each side of the frame, which is centrally located with respect to the carriage, is mechanism for supporting rolls of strip material, for stripping it from its liner, for guiding the strip, and for rewinding the liner. These mechanisms are substantially identical in construction and, therefore, only one of these will be described as follows:

Each mechanism comprises a square shaft 30 adapted to receive and support a stock shell 31 having a supply 32 of strip material interwound with liner material. A brake drum 33 fixed to shaft 30 is encircled by a band brake 34 whereby its rotation may be retarded. A set of parallel guide rolls 35, 36, 37 are provided near the stock supply and have sprockets 38, 39, 40 fixed to them respectively. A chain 41 engages the three sprockets so as to cause the rolls to rotate in unison. A rubber faced roll 42 is adapted to be driven by a motor 43 through a speed reducer 44, chain 45 and sprockets 46, 47. Sprocket 47 is mounted on roll 42 but is separated therefrom by an overrunning clutch 48 so that roll 42 can be driven thereby in only one direction. A stock shell 49 is supported by a swing frame 50 so as to rest on the rubber faced roll 42. A vertically adjustable guide 51 is pivoted at 52 to the frame and has a balancing counterweight 53 attached thereto. The guide 51 extends over the drum 17 and has guide rollers 54, 55 rotatably mounted thereon and fences 56, 57 adjustable therealong for guiding the strip material. Material guiding rolls 58 and 59 are rotatably mounted on the frame 13.

In use a strip 60 of adhesive material is drawn from the supply 32 over rolls 35 and 36 then under roll 58 over roll 59 and over guide 51 between fences 56, 57. The liner accompanies the strip over roll 35 and then proceeds downwardly under rolls 37 and 42 and is wound about shell 49. The rotation of roll 42 draws the liner from the strip material at roller 36. All of the bars and rolls 30, 35, 36, 37 and 42 are supported only at the frame and extend therefrom so as to facilitate threading the machine. One or more delivery mechanisms may be supported above each other on the same frame, two being shown, one above the other. Similar delivery mechanism is supported on the opposite side of the frame 13. Rubber covered shell driving rolls 42 and 61 in one stack of delivery mechanisms may be driven by the same motor 43 alternately. For this purpose the overrunning clutches on rolls 42 and 61 are arranged to drive in opposite directions with respect to each other and the liners are passed over their upper surfaces in opposite directions. Motor 43 is reversible and when running in one direction drives roll 42 and when running in the opposite direction drives roll 61.

Referring to Fig. 1, the sheet delivery mechanism is shown with a strip 70 aligned with the building drum. By moving the mechanism along the ways 11, 12, the strip of material 60 may be aligned with the drum.

For shifting the mechanism quickly and at the ends of the movement providing acceleration and deceleration of movement so as to prevent shifting of the strip material with relation to its supports, a reversible electric motor 71 is fixed to the carriage 18 and drives a speed reducer 72. A vertical shaft 73 of the speed reducer extends downwardly through the carriage. A driving disc 74 is fixed to the shaft. A crank arm 75 is rotatably mounted on the shaft and is clamped against the disc 74, as by a friction disc 76, spring-pressed thereagainst. Disc 76 is dowelled to disc 74 but is slidable along a hub 74a thereof and is held against the crank arm by compression coil springs 77 and a nut 78 threaded on the end of the hub. A wrist pin 79 is fixed to the end of crank arm 75 and a roller bushing 80 rotatable about the pin is confined in a slot extending at right angles to the ways 11, 12 and defined by guide strips 81, 82 fixed to the base 10. The crank arm is equal in radius to one-half the desired shifting distance and the bolt retaining the roller bushing 80 is greater in length than the radius of the crank arm and intersects the path traced by the axis of shaft 73 during movement of the carriage. The arrangement is such that in one-half revolution of shaft 73, the roller 80 moves from one dead center position along the slot from near one end to the other and back again to a second dead center position, moving the carriage along its ways the desired distance. The movement is a substantially harmonic one and the carriage is slowly accelerated to maximum speed and then decelerated to zero speed. At the dead center position, a block 83 prevents movement of the roller and crank arm through more than 180°, and acts as a definite stop. Near the end of its travel the crank arm 75 which moves the carriage encounters a limit switch 84 located on the carriage 18 in its path which breaks the circuit to the motor by contact with the crank. A similar limit switch 85 at the other end of the carriage acts in the same manner to break the motor circuit near the end of carriage movement in the opposite direction. The motor 71 is reversible and rotation of the crank is limited to one-half revolution by the stop block and the limit switches, while the friction drive between the crank arm and its driving shaft prevents injury to the motor. The deceleration of speed of the carriage prevents shifting of the sheet material with relation to the carriage and the carriage is stopped in proper alignment of the material with the building drum.

In the apparatus of Figs. 5 to 7, a bed plate 100 is provided having a vertical guide portion 101 adapted to guide a carriage 102 for horizontal travel parallel to the axis of a rotatable building drum. Rollers 103, 104, 105, 106 are rotatably mounted on the vertical portion 101 and engage a dove-tailed portion of the carriage to reduce friction. Vertically disposed frame members 107, 108, 109, 110 are fixed to the carriage for supporting rolls of prepared sheet material, linear windup mechanism and guide rolls similar to the mechanism of Figs. 1 and 2, the guide mechanism being arranged, as in Fig. 1 to align alternately with a building drum at two positions of the carriage. A stop 111 fixed to the carriage 102 is adapted to engage stops 112, 113 at opposite ends of the bed plate for accurately aligning the carriage at these positions.

For moving the carriage along its ways in opposite directions, a double-acting fluid pressure operated cylinder 114 is fixed to the bed plate and its piston 115 is fixed to one end of a piston rod 116, the other end of which is fixed to the carriage 102, as at 117. Pipes 118, 119 connect opposite ends of the cylinder 114 with a four-way valve 120 having a fluid pressure supply line 121, and an exhaust 122. The arrangement is such that in the position shown in Fig. 6, fluid pressure from any convenient source (not shown) is supplied to the right end of the cylinder 114 and the carriage 102 is moved to the position shown with stop 111 contacting stop 112 and by rotating the valve 120 through 90 degrees in a clockwise direction, the right end of cylinder 114 will be opened to exhaust and fluid pressure will be supplied to the left end of cylinder 114 moving the carriage 102 to the right in Fig. 6 until stop 111 engages stop 113.

For decelerating movement of the carriage at the ends of the stroke, a hydraulic snubber 125, of the type having a fixed cylinder 126 and a movable piston 127 is fixed to one end of the carriage 102 and a second snubber 128 has its cylinder 129 fixed to the opposite end of the carriage 102 with the cylinders facing each other. Their pistons 127 and 130 are connected by a rod 131. An arm 132 fixed to the bed plate, has a clearance opening 133 which extends about the rod so that the rod passes freely therethrough, throughout most of its length. Enlarged portions 134, 135 of the rod at its opposite ends are adapted to engage the arm 132 near the end of the movement of the carriage and thereby cause movement of the rod with the carriage 102 before the carriage stops. This arrangement provides a lost motion mechanism permitting free movement of the carriage throughout most of its movement and applying a decelerating resistance throughout the remainder of its movement.

Each snubber is of the same construction and any single acting hydraulic snubber may be employed. A snubber for suitable construction is shown in Fig. 7, in which the cylinder 126 is fitted with a piston 127, sealing rings 136 being provided on the piston to prevent leakage. A chamber 137 is provided for storing liquid such as oil and is separated from the cylinder 126 by a partition 138 having openings 139 therethrough. A valve disc 140 normally closes the openings and is supported by a screw 141 fixed to the partition, and a coil spring 142 about the body of the screw presses the valve against its seat. A by-pass 143 extends about the partition from the cylinder 126 to the chamber 137. A needle valve screw 144 is threaded through the wall about the by-pass and is adapted to adjustably restrict the passage. Chamber 137 is closed by a threaded plug 145 having a flange 146 for securing the snubber to the carriage, bolts 147 being provided for this purpose. The arrangement is such that when piston 127 is moved toward partition 138, valve disc 140 closes openings 139 and liquid is forced through by-pass 143 past needle valve 144 to chamber 137 and the by-pass provides great resistance to such movement, and when piston 127 is moved in the opposite direction, valve 140 opens and liquid is drawn into cylinder 126 from chamber 137 without substantial resistance to movement. As pistons 127 and 129 are connected by rod 131, one cylinder is charged while the other is exhausted.

In either form of apparatus illustrated and described, the carriage supporting the stock rolls, liner windups and guides may be moved from one delivery position to another by power under control of the operator, and the movements of the carriage are automatically decelerated gradually at the end of the movement.

Variations may be made without departing from the invention as it is defined by the following claims.

We claim:

1. Material-supplying apparatus for a tire-building form, said apparatus comprising a carriage movable axially of the form, a plurality of strip supplying means on said carriage adapted to be aligned with said form for delivery of strip material thereto by movement of said carriage from one position of alignment to another, means for moving said carriage from one position of alignment to another, and means for gradually decelerating carriage movement as the carriage approaches a position of alignment, said decelerating means comprising a crank and slot connection between said carriage and a carriage guiding structure.

2. Material-supplying apparatus for a tire-building form, said apparatus comprising a track parallel to the axis of said form, a carriage movable along said track, a plurality of strip supply means on said carriage adapted to be aligned alternately with said form for delivery of strip material thereto by movement of said carriage, and means for moving said carriage from one position of alignment to another to align said strip supply means with said form, said carriage moving means comprising a motor, a friction driven crank adapted to be rotated thereby, and means on said track to guide said crank for providing relative movement between said carriage and said track.

3. Tire-building apparatus comprising a rotatable building form, a track parallel to the axis of said form, a carriage movable along said track, a plurality of strip supply means on said carriage adapted to be aligned alternately with said form for delivery of strip material thereto by movement of said carriage, and means for moving said carriage to align said strip supply means with said form, said carriage moving means comprising a motor, a crank adapted to be frictionally driven thereby, said crank engaging a slot on said track, a stop for positively preventing rotation of said crank beyond a dead center position, and means responsive to movement of said carriage for disconnecting said motor from its source of power before said crank contacts with said stop.

URBAN C. HAREN.
VICTOR H. HASSELQUIST.

CERTIFICATE OF CORRECTION.

Patent No. 2,365,341. December 19, 1944.

URBAN C. HAREN, ET AL.

It is hereby certified that error appears in the printed specification of the above numbered patent requiring correction as follows: Page 2, first column, line 50, after "springs 77" strike out "and" and insert instead --backed by a disc 76a keyed to and slideably mounted on a hub 74a of disc 74 and adjustable along the hub by--; and second column, line 24, for "linear" read --liner--; and that the said Letters Patent should be read with this correction therein that the same may conform to the record of the case in the Patent Office.

Signed and sealed this 8th day of May, A. D. 1945.

Leslie Frazer

Acting Commissioner of Patents.

(Seal)